United States Patent
Bueren

[11] 3,990,325
[45] Nov. 9, 1976

[54] APPARATUS FOR EQUALIZING MASS FORCES OF A RECIPROCATING PISTON, CRANKSHAFT ENGINE

[75] Inventor: Manfred Bueren, Wolfsburg, Germany

[73] Assignee: Volkswagenwerk Aktiengesellschaft, Wolfsburg, Germany

[22] Filed: Sept. 5, 1975

[21] Appl. No.: 610,864

[30] Foreign Application Priority Data
Oct. 2, 1974 Germany............................ 2447001

[52] U.S. Cl.................................. 74/604; 74/52; 123/192 B
[51] Int. Cl.² ...................................... F16F 15/26
[58] Field of Search....................... 74/604, 603, 52; 123/192 B

[56] References Cited
UNITED STATES PATENTS

| | | | |
|---|---|---|---|
| 2,325,835 | 8/1943 | Deerwester et al................... | 74/604 |
| 2,914,964 | 12/1959 | Bensinger et al..................... | 74/604 |
| R28,512 | 8/1975 | Kinoshita............................. | 74/604 |

*Primary Examiner*—Samuel Scott
*Assistant Examiner*—F. D. Shoemaker
*Attorney, Agent, or Firm*—Brumbaugh, Graves, Donohue & Raymond

[57] ABSTRACT

Apparatus for balancing or equalizing the mass forces of an engine having reciprocating pistons turning a crankshaft rotates a drive gear twice as fast as the crankshaft. A planetary gear is eccentrically carried on the drive gear and meshes with internal teeth on a stationary sun gear at a gear ratio of 1:2. The planetary gear has an eccentrically placed counterweight of a mass such that it balances the mass forces of the engine of the same order as the ratio of drive gear to crankshaft speed, Order II mass forces for this example. The drive gear also has an eccentrically placed counterweight which balances the planetary gear as they rotate with the drive gear. The counterweight on the planetary gear is preferably placed as near as possible to the pitch diameter of the planetary gear so as to make its path of travel as nearly linear as possible.

5 Claims, 2 Drawing Figures

APPARATUS FOR EQUALIZING MASS FORCES OF A RECIPROCATING PISTON, CRANKSHAFT ENGINE

BACKGROUND OF THE INVENTION

The invention relates to a device for equalizing the mass forces of reciprocating piston, crankshaft engines, and in particular, the mass forces of Order II of four-cylinder, four-stroke, in-line engines.

It is known that the operation of reciporcating piston, crankshaft engines produces mass forces and moments due especially to the reciprocating parts, such as pistons, connecting rods and the like, which forces are more or less imbalanced depending on type of engine as well as number and arrangement of crankshaft cranks. These imbalanced forces affect the performance and quietness of the engine.

Mass forces of Orders I and II can be balanced by means of revolving counterweights and/or pairs of counterweights. Thus, there is a known arrangement, called A Lanchester balance, for equalizing the mass forces of Order II in piston engines, particularly four-cylinder, four-stroke, in-line engines. In this arrangement, two counterweighted auxiliary shafts rotate in opposite directions at twice the speed of the crankshaft. This mass balancing system, however, requires a comparatively high mechanical outlay and, because of its length, great structural strength. Furthermore, the high speed of the auxiliary shafts and their drives creates considerable noise.

SUMMARY OF THE INVENTION

The object of the invention, therefore, is seen in the provision of a mass balancing system of the type initially mentioned, that will equalize mass forces of any order in substantially less space and avoiding of the above mentioned disadvantages.

To accomplish this object, the invention proposes a planetary gear meshing with a fixed, internally toothed sun gear in a ratio of 1 to 2. The planetary gear is provided with a counterweight and eccentrically mounted on a drive gear which is driven by the crankshaft at a stepped-up speed ratio thereto corresponding to the order of the mass forces to be equalized. In this way, neatly combined rotating parts in an extremely compact assembly occupying a short length create imbalanced forces opposed to the imbalanced mass forces of the engine to be equalized. Proper selection of the mass of the counterweight on the planetary gear then balances these forces.

The resultant motion of the counterweight is virtually linear especially if the counterweight, according to a preferred feature of the invention, is arranged as close as possible to the pitch circle of the planetary gear. Linear travel of the counterweight avoids transverse forces from the counterweight which would require separate balancing compensation. Proper initial positioning of the planetary gear can make this linear motion vertical.

The drive gear preferably has an eccentric counterweight opposite the planetary gear to equalize the revolving mass force generated by the mass of the planetary gear.

For the practical design of the mass equalizing device according to the invention, it is proposed that the internally toothed sun gear preferably be arranged in the median plane of the crankshaft and rigidly connected to the median crankshaft main bearing. Further, the drive gear may advantageously and preferably consist of a spur gear driven by a spur gear on the crankshaft adjacent to the median crankshaft main bearing.

DESCRIPTION OF THE DRAWINGS

Other advantages and the features of the invention are set out in the following description, which further illustrates by way of example the embodiment of the invention shown in the drawing in which, in schematic representation.

DESCRIPTION OF THE PREFERRED EMBODIMENT

Figure 1:
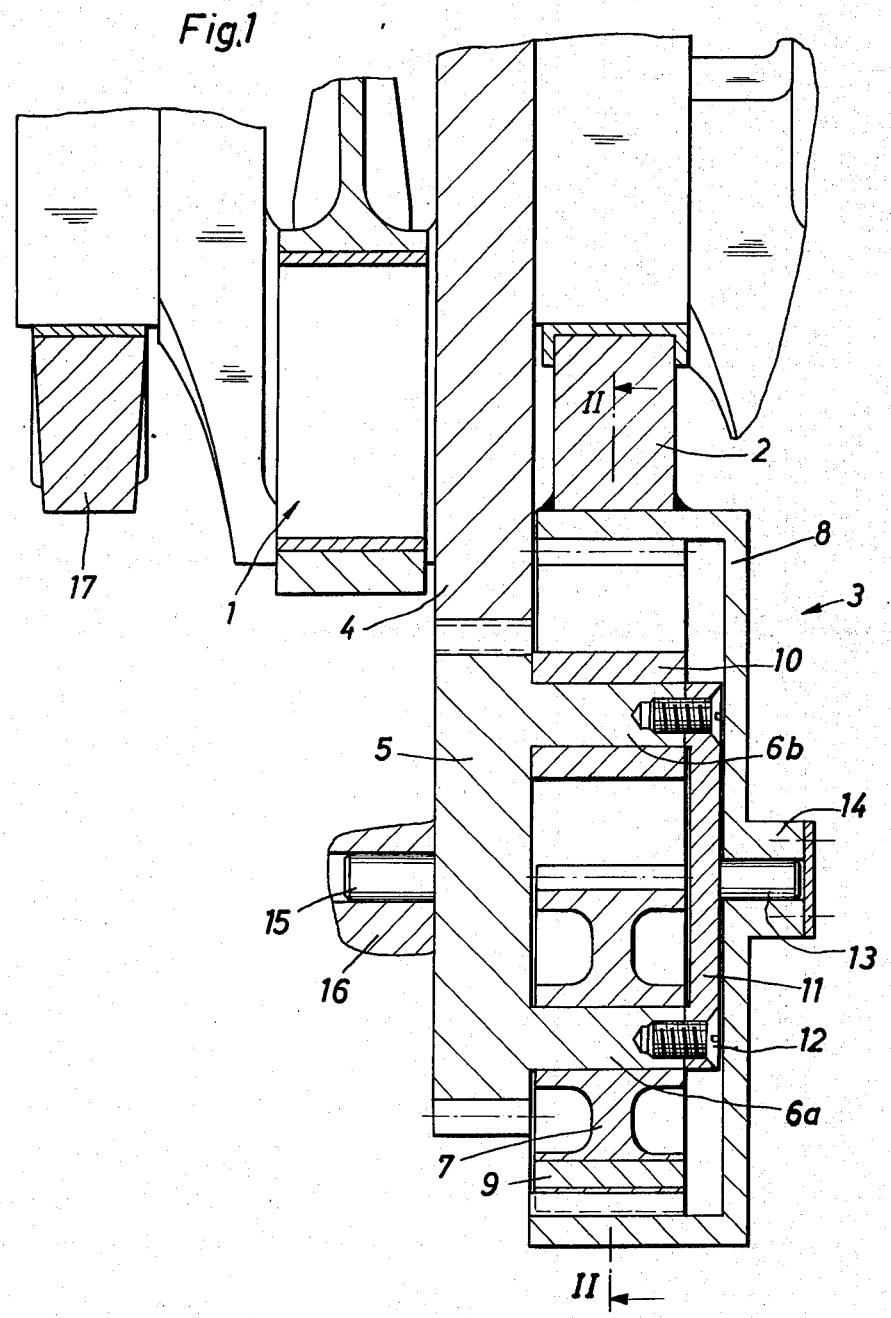
FIG. 1 shows a portion of a longitudinal section of a four-cylinder, four-stroke, in-line engine with mass equalizing apparatus according to the invention arranged at a median crankshaft main bearing.

In FIG. 1, 1 designates the crankshaft of a four-cylinder, four-stroke, in-line engine for a motor vehicle equipped with mass equalizing apparatus at 3 according to the invention in the neighborhood of the median crankshaft main bearing 2. The mass equalizing device 3 consists of a drive gear in the form of a spur gear 5 driven by a crank throw 4, likewise in the form of a spur gear, adjacent to the mean crankshaft main bearing 2. The drive gear 5 has two eccentric crank pins 6a and 6b diametrally opposed at equal distances from the axis of the drive gear.

Figure 2:
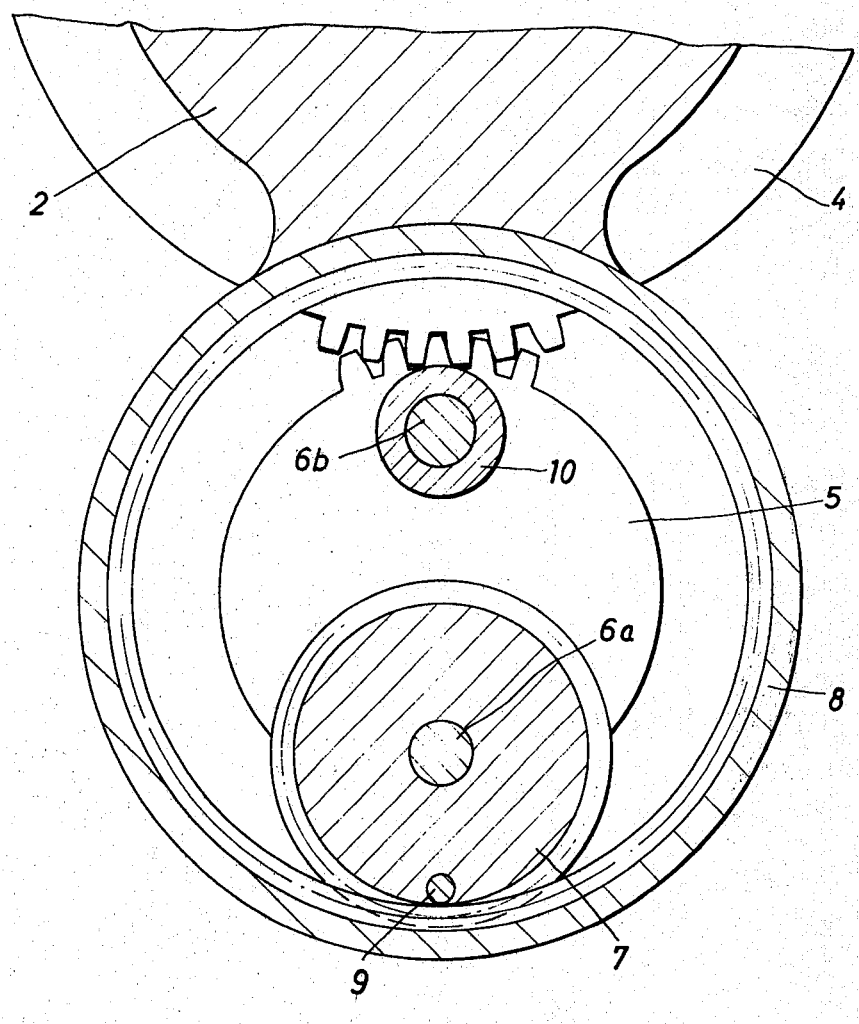
FIG. 2 shows a section of the equalizing apparatus taken at the line II—II in FIG. 1.

A planetary gear 7 is mounted on pin 6a. It meshes in a ratio of 1 to 2 with a stationary, internally toothed sun gear 8 preferably rigidly connected to the crankshaft main bearing 2. The planetary gear 7 has an eccentrically positioned counterweight 9 arranged near its pitch circle as also shown in FIG. 2. It may consist, for example, of a lead weight fixed to the planetary gear 7.

A counterweight 10 is arranged on the crank pin 6b of drive gear 5. Its mass so chosen that the mass force generated by revolving the planetary gear 7 about the drive gear is just compensated.

The embodiment schematically shown in FIG. 1 by way of example also indicates a possible way of lodging the drive gear 5 in the stationary sun gear 8 which is attached to the median crankshaft main bearing 2. A plate 11 is fixed on the exposed faces of crank pins 6a and 6b with screws 12. A bearing pin 13 of plate 11 rests in a bearing 14 of the sun gear. A shaft pin 15 on the opposed face of the drive gear 5 is held in a bearing 16 that may, for example, be connected to a crankshaft bearing 17 by brackets not here shown.

When the engine is running, the apparatus 3 is driven by the crankshaft 1 by way of the spur gear crank throw 4, a transmission ratio of 2 to 1 between gear 4 and drive gear 5 being provided to equalize the mass forces of Order II. Now as the drive gear 5 revolves, the planetary gear 7 on the crank pin 6a and in mesh with the stationary, internally toothed sun gear 8 at a ratio of 1 to 2 rotates about its axis as it revolves with the drive gear, and the counterweight 9 near the pitch circle of the planetary gear nearly linearly reciprocates in a vertical direction to produce mass forces opposed to the Order II mass forces of the engine. By suitable selection of the mass of counterweight 9, the mass forces of Order II of the four-cylinder, four-stroke, in-line engine here shown can be completely compensated for in both magnitude and direction. The apparatus is thus comparatively short and compact but nevertheless effective. Obviously, by suitable modification of the ratio of drive gear speed to crankshaft speed, other orders of mass forces may be equalized as well.

I claim:

1. Apparatus for equalizing the mass forces of a reciprocating piston and crankshaft engine, in particular the mass forces of Order II of a four-cylinder, four-stroke in-line engine, comprising:
   an internally toothed, stationary sun gear;
   a drive gear driven by the crankshaft with a stepped-up speed ratio corresponding to the order of mass forces to be equalized;
   a planetary gear eccentrically mounted on the drive gear and meshing in a ratio of 1 to 2 with the internal teeth of the sun gear for rotation;
   and a counterweight eccentrically positioned on the planetary gear.

2. Apparatus according to claim 1, wherein the counterweight is arranged proximally to the pitch circle of the planetary gear.

3. Apparatus according to claim 1 wherein the drive gear also has an eccentrically positioned counterweight for balancing the planetary gear.

4. Apparatus according to claim 1 wherein the internally toothed sun gear is arranged in the median plane of the crankshaft engine and rigidly connected to a median crankshaft main bearing.

5. Apparatus according to claim 1 wherein the drive gear consists of a spur gear driven by a spur gear on the crankshaft.

\* \* \* \* \*